(12) United States Patent
Johnston

(10) Patent No.: US 9,758,011 B2
(45) Date of Patent: *Sep. 12, 2017

(54) EV MULTI-MODE THERMAL MANAGEMENT SYSTEM

(71) Applicant: Atieva, Inc., Redwood City, CA (US)

(72) Inventor: Vincent George Johnston, Half Moon Bay, CA (US)

(73) Assignee: ATIEVA, INC., Menlo Park, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 14/519,943

(22) Filed: Oct. 21, 2014

(65) Prior Publication Data

US 2016/0107506 A1  Apr. 21, 2016

Related U.S. Application Data

(63) Continuation-in-part of application No. 14/519,182, filed on Oct. 21, 2014.

(51) Int. Cl.
*B60H 1/00* (2006.01)
(52) U.S. Cl.
CPC ..... *B60H 1/00278* (2013.01); *B60H 1/00921* (2013.01); *B60H 2001/00307* (2013.01); *B60H 2001/00928* (2013.01)

(58) Field of Classification Search
CPC ............ B60H 1/00278; B60H 1/00921; B60H 2001/00307; B60H 2001/00928; H01M 2/1016
USPC ............................................. 165/202, 104.21
See application file for complete search history.

(56) References Cited

U.S. PATENT DOCUMENTS

| | | | |
|---|---|---|---|
| 6,360,835 B1 | 3/2002 | Skala | |
| 7,789,176 B2 | 9/2010 | Zhou | |
| 8,336,319 B2 | 12/2012 | Johnston et al. | |
| 2014/0041826 A1 | 2/2014 | Takeuchi et al. | |
| 2014/0193683 A1* | 7/2014 | Mardall | H01M 2/1077 429/99 |
| 2016/0107502 A1* | 4/2016 | Johnston | B60H 1/00921 165/202 |

(Continued)

FOREIGN PATENT DOCUMENTS

FR      2 993 642       1/2014

OTHER PUBLICATIONS

U.S. Appl. No. 14/340,606, J.P. Gauthier.

*Primary Examiner* — Davis Hwu
(74) *Attorney, Agent, or Firm* — Patent Law Office of David G. Beck

(57) ABSTRACT

A multi-mode vehicle thermal management system is provided that allows efficient thermal communication between a refrigerant-based thermal control loop and three non-refrigerant-based thermal control loops, where one of the non-refrigerant-based loops provides temperature control over the vehicle's passenger cabin, a second of the non-refrigerant-based control loops is thermally coupled to the vehicle's battery system and the third of the non-refrigerant-based control circuits is thermally coupled to the vehicle's drive train. The refrigerant-based control loop may be operated either in a heating mode or a cooling mode and is coupled to the vehicle's HVAC system using a refrigerant-air heat exchanger, and to the battery thermal control loop using refrigerant-fluid heat exchangers.

16 Claims, 17 Drawing Sheets

(56) References Cited

U.S. PATENT DOCUMENTS

| | | | |
|---|---|---|---|
| 2016/0107503 A1* | 4/2016 | Johnston ............ | B60H 1/00921 165/202 |
| 2016/0107504 A1* | 4/2016 | Johnston ............ | B60H 1/00921 165/202 |
| 2016/0107505 A1* | 4/2016 | Johnston ............ | B60H 1/00385 165/202 |

* cited by examiner

FIG. 15

EV MULTI-MODE THERMAL MANAGEMENT SYSTEM

CROSS-REFERENCE TO RELATED APPLICATION

This application is a continuation-in-part of U.S. patent application Ser. No. 14/519,182, filed 21 Oct. 2014, the disclosure of which is incorporated herein by reference for any and all purposes.

FIELD OF THE INVENTION

The present invention relates generally to electric vehicles and, more particularly, to a thermally efficient and configurable thermal management system.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, and cost.

Electric vehicles, due to their reliance on rechargeable batteries, require a relatively sophisticated thermal management system to insure that the batteries remain within their desired operating temperature range. Furthermore, in addition to controlling battery temperature the thermal management system must also be capable of heating and cooling the passenger cabin while not unduly affecting the vehicle's overall operating efficiency.

A variety of approaches have been taken to try and meet these goals. For example, U.S. Pat. No. 6,360,835 discloses a thermal management system for use with a fuel-cell-powered vehicle, the system utilizing both low and high temperature heat transfer circuits that share a common heat transfer medium, the dual circuits required to adequately cool the vehicle's exothermic components and heat the vehicle's endothermic components.

U.S. Pat. No. 7,789,176 discloses a thermal management system that utilizes multiple cooling loops and a single heat exchanger. In an exemplary embodiment, one cooling loop is used to cool the energy storage system, a second cooling loop corresponds to the HVAC subsystem, and a third cooling loop corresponds to the drive motor cooling system. The use of a heater coupled to the first cooling loop is also disclosed, the heater providing a means for insuring that the batteries are warm enough during initial vehicle operation or when exposed to very low ambient temperatures.

U.S. Pat. No. 8,336,319 discloses an EV dual mode thermal management system designed to optimize efficiency between two coolant loops, the first cooling loop in thermal communication with the vehicle's batteries and the second cooling loop in thermal communication with at least one drive train component such as an electric motor or an inverter. The disclosed system uses a dual mode valve system to configure the thermal management system between a first mode and a second mode of operation, where in the first mode the two cooling loops operate in parallel and in the second mode the two cooling loops operate in series.

Although the prior art discloses numerous techniques for maintaining the temperature of the battery pack and other vehicle subsystems, an improved thermal management system is needed that efficiently controls the temperature of each of the vehicle's thermal systems while optimizing overall vehicle operating efficiency. The present invention provides such a thermal management system.

SUMMARY OF THE INVENTION

The present invention provides a vehicle thermal management system that utilizes three separate thermal control circuits to provide an efficient thermal control system. The system includes (i) a passenger cabin thermal control loop comprising a first circulation pump and a liquid-air heat exchanger, where the first circulation pump circulates a first heat transfer fluid within the passenger cabin thermal control loop and through the liquid-air heat exchanger, and where the passenger cabin thermal control loop provides temperature control of a vehicle passenger cabin; (ii) a battery thermal control loop comprising a second circulation pump that circulates a second heat transfer fluid within the battery thermal control loop, where the battery thermal control loop is thermally coupled to a vehicle battery pack, and where the passenger cabin thermal control loop operates in parallel with and independent of the battery thermal control loop; (iii) a drive train control loop comprising a third circulation pump that circulates a third heat transfer fluid within the drive train control loop, where the drive train control loop is thermally coupled to at least one drive train component, and where the passenger cabin thermal control loop operates in parallel with and independent of the drive train thermal control loop, and where the battery thermal control loop operates in parallel with and independent of the drive train thermal control loop; (iv) a refrigerant-based thermal control loop comprised of a refrigerant, a compressor, and a condenser/evaporator; (v) a refrigerant-air heat exchanger coupled to the refrigerant-based thermal control loop by a first expansion valve, where the refrigerant-air heat exchanger is thermally coupled to a vehicle HVAC system; (vi) a refrigerant valve operable in at least two modes; and (vii) a refrigerant-fluid heat exchanger coupled to the battery thermal control loop, where the refrigerant valve in a first mode directs the refrigerant through the refrigerant-air heat exchanger and the first expansion valve, and where the refrigerant valve in a second mode directs the refrigerant through the refrigerant-fluid heat exchanger which, in turn, heats the second heat transfer fluid within the battery thermal control loop.

The refrigerant-based thermal control loop may further include a second refrigerant-fluid heat exchanger coupled to the refrigerant-based thermal control loop by a second expansion valve, where the second refrigerant-fluid heat exchanger is thermally coupled to the battery thermal control loop.

The system may include (i) a refrigerant by-pass valve; and (ii) a second expansion valve interposed between the refrigerant-fluid heat exchanger and the condenser/evaporator, where when the refrigerant valve is in the first mode the refrigerant by-pass valve is configured to allow the refrigerant in the refrigerant-based thermal control loop to by-pass the second expansion valve, and where when the refrigerant valve is in the second mode the refrigerant by-pass valve is configured to allow the refrigerant in the refrigerant-based thermal control loop to flow through the second expansion valve. The by-pass valve and the second expansion valve may be combined into a single electronic expansion valve.

The refrigerant-based thermal control loop may further include a refrigerant by-pass valve, where the refrigerant by-pass valve in a first operational mode couples the refrigerant-fluid heat exchanger to the refrigerant-based thermal control loop, and where the secondary refrigerant by-pass valve in a second operational mode decouples the refrigerant-fluid heat exchanger from the refrigerant-based thermal control loop.

The passenger cabin thermal control loop may further include a supplemental electric heater configured to heat the first heat transfer fluid within the passenger cabin thermal control loop when electrical power is connected to the supplemental electric heater.

In another aspect, the system may include a radiator coupled to the drive train thermal loop. The system may include a diverter valve, where the diverter valve in a first position couples the radiator to the drive train thermal loop and allows at least a portion of the third heat transfer fluid to flow through the radiator, and where the diverter valve in a second position decouples the radiator from the drive train thermal loop and allows the third heat transfer fluid within the drive train thermal loop to bypass the radiator. In the first position, the diverter valve may be configured to allow a second portion of the third heat transfer fluid to bypass the radiator. In a third position, the diverter valve may be configured to couple the radiator to the drive train thermal loop and allow the third heat transfer fluid to flow through the radiator while preventing the second portion of the third heat transfer fluid from bypassing the radiator. The system may further include a fan configured to force air through the radiator.

In another aspect, the vehicle battery pack may include a plurality of batteries and a plurality of cooling conduits in thermal communication with the plurality of batteries, where the second heat transfer fluid flows through the plurality of cooling conduits. The vehicle drive train component may be selected from the group consisting of a motor, a gearbox, and a power inverter. A DC/DC converter may be thermally coupled to the drive train control loop.

In another aspect, the first and/or the second and/or the third heat transfer fluid may be selected from the group of fluids consisting of water and water with an additive, where the additive may be selected from the group consisting of ethylene glycol and propylene glycol.

In another aspect, the system may include a coolant reservoir, where the third heat transfer fluid within the drive train thermal loop flows into and out of the coolant reservoir.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 15 illustrates a modification of the thermal management system shown in FIG. 13 in which the refrigeration system is used as a heat pump to heat the battery pack thermally coupled to the battery thermal control loop;

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, steps, operations, elements, and/or components, but do not preclude the presence or addition of one or more other features, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, and, similarly, a first step could be termed a second step, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of one or more batteries electrically interconnected to achieve the desired voltage and capacity, where the battery assembly is typically contained within an enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system. The terms "thermal control circuit" and "thermal control loop" may be used interchangeably.

Figure 1:
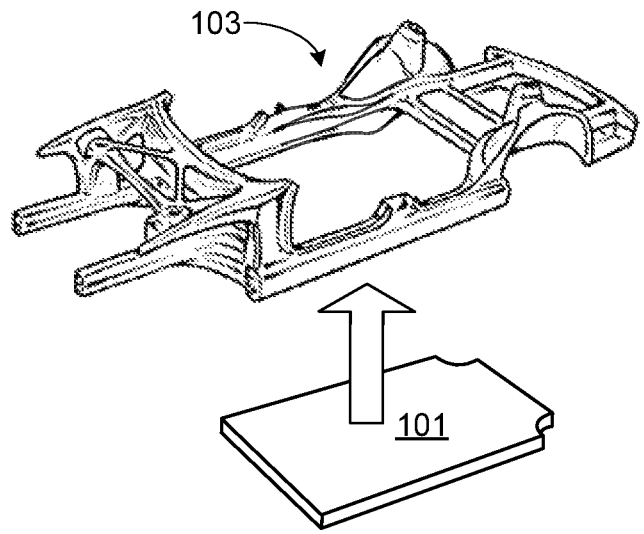
FIG. 1 provides a perspective view of a battery pack and the vehicle chassis to which it is to be mounted.

FIG. 1 provides a perspective view of a battery pack 101 configured to be mounted under vehicle chassis 103. It should be understood that the present invention is not limited to a specific battery pack mounting scheme, battery pack size, or battery pack configuration.

Figure 2:
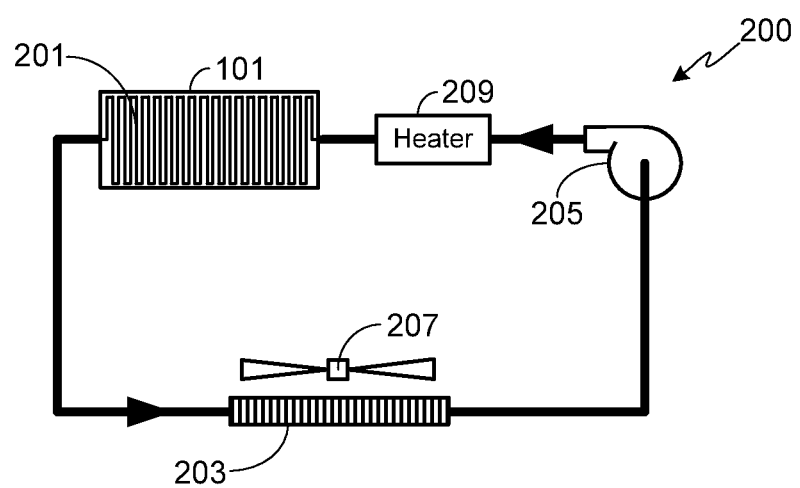
FIG. 2 illustrates an exemplary battery pack cooling system in accordance with the prior art.

FIG. 2 illustrates an exemplary battery thermal management system 200 in accordance with the prior art. In system 200, the temperature of the batteries within battery pack 101 is controlled by pumping a thermal transfer medium, e.g., a liquid coolant, through a plurality of cooling conduits 201 integrated into battery pack 101. Conduits 201, which are fabricated from a material with a relatively high thermal conductivity, are positioned within pack 101 in order to optimize thermal communication between the individual batteries, not shown, and the conduits, thereby allowing the temperature of the batteries to be regulated by regulating the flow of coolant within conduits 201 and/or regulating the transfer of heat from the coolant to another temperature control system. In the illustrated embodiment, the coolant within conduits 201 is pumped through a radiator 203 using a pump 205. A blower fan 207 may be used to force air through radiator 203, for example when the car is stationary or moving at low speeds, thus insuring that there is an adequate transfer of thermal energy from the coolant to the ambient environment. System 200 may also include a heater 209, e.g., a PTC heater, that may be used to heat the coolant within conduits 201, and thus heat the batteries within pack 101.

Figure 3:
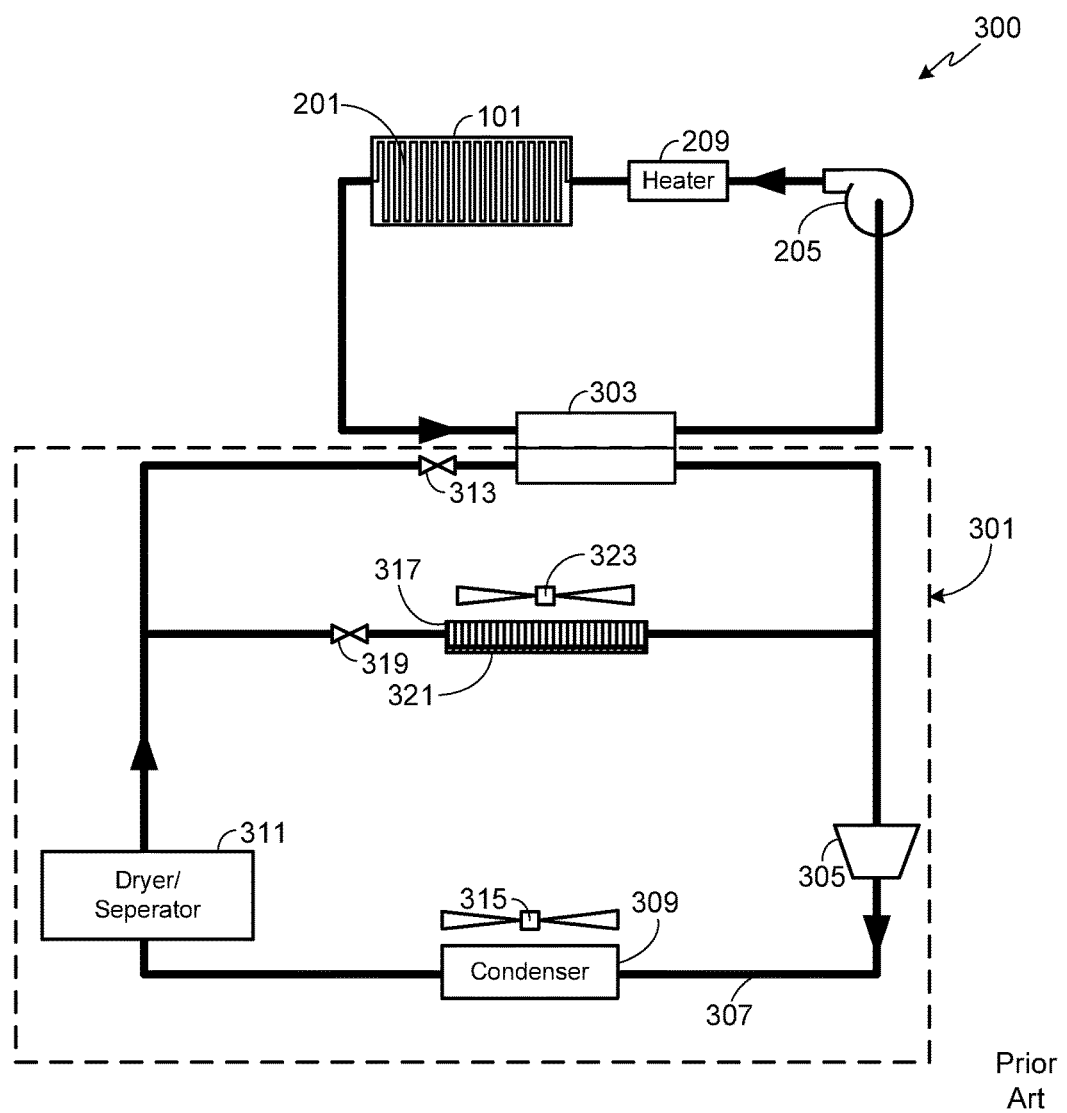
FIG. 3 illustrates an alternate battery pack cooling system in accordance with the prior art.

FIG. 3 illustrates an alternate battery pack thermal management system 300. In system 300 the coolant within conduits 201 is coupled to a secondary thermal management system 301 via a heat exchanger 303. Preferably thermal management system 301 is a refrigeration system and as such, includes a compressor 305 to compress the low temperature vapor in refrigerant line 307 into a high temperature vapor and a condenser 309 in which a portion of the captured heat is dissipated. After passing through condenser 309, the refrigerant changes phases from vapor to liquid, the liquid remaining at a temperature below the saturation temperature at the prevailing pressure. The refrigerant then passes through a dryer 311 that removes moisture from the condensed refrigerant. After dryer 311, refrigerant line 307 is coupled to heat exchanger 303 via thermal expansion valve 313 which controls the flow rate of refrigerant into heat exchanger 303. Additionally, in the illustrated system a blower fan 315 is used in conjunction with condenser 309 to improve system efficiency.

In a typical vehicle configuration, thermal management system 301 is also coupled to the vehicle's heating, ventilation and air conditioning (HVAC) system. In such a system, in addition to coupling refrigerant line 307 to heat exchanger 303, line 307 may also be coupled to the HVAC evaporator 317. A thermal expansion valve 319 is preferably used to control refrigerant flow rate into the evaporator. A heater, for example a PTC heater 321 integrated into evaporator 317, may be used to provide warm air to the passenger cabin. In a conventional HVAC system, one or more fans 323 are used to circulate air throughout the passenger cabin, where the circulating air may be ambient air, air cooled via evaporator 317, or air heated by heater 321.

Figure 4:
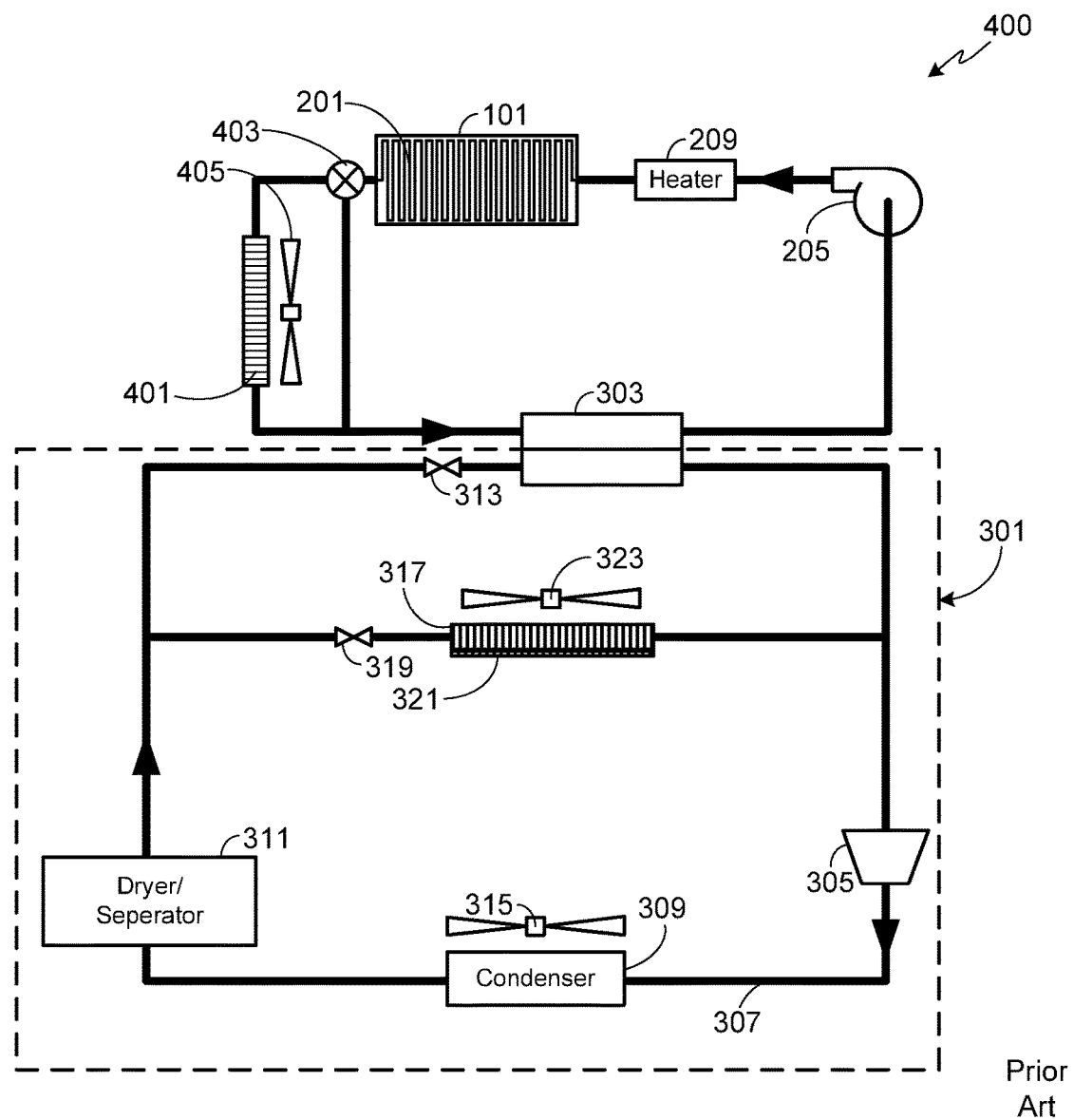
FIG. 4 illustrates an alternate battery pack cooling system in accordance with the prior art, the illustrated system utilizing both a radiator and a heat exchanger as described relative to FIGS. 2 and 3, respectively.

In some electric vehicles, battery pack cooling is accomplished using a combination of a radiator such as that shown in FIG. 2, and a heat exchanger such as that shown in FIG. 3. FIG. 4 illustrates such a conventional cooling system. In system 400, the coolant passing through battery pack 101 via conduits 201 may be directed through either radiator 401 or heat exchanger 303. Valve 403 controls the flow of coolant through radiator 401. Preferably a blower fan 405 is included in system 400 as shown, thus providing means for forcing air through the radiator when necessary, for example when the car is stationary.

Figure 5:
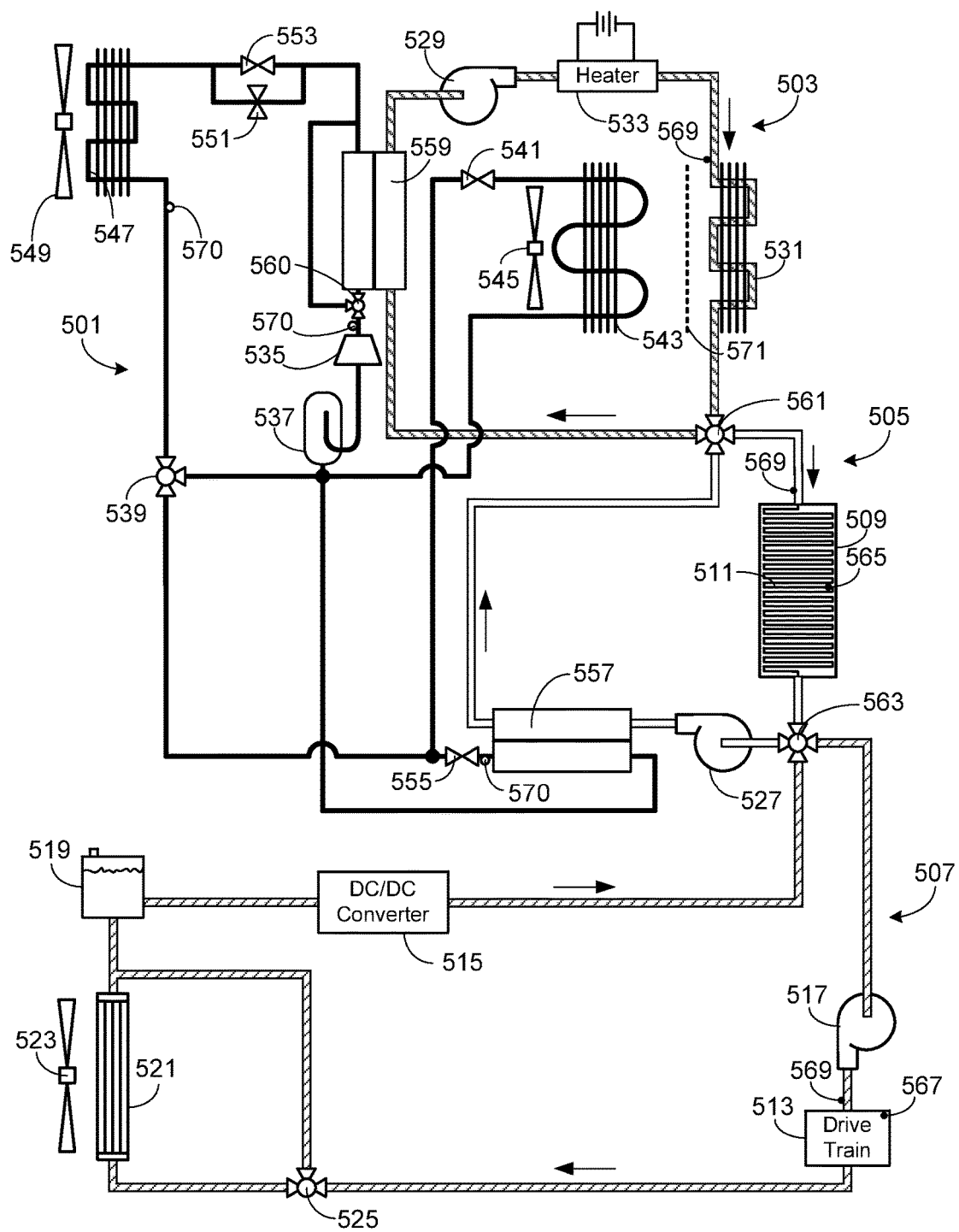
FIG. 5 schematically illustrates a preferred embodiment of the thermal management system of the invention.

FIG. 5 provides a schematic overview of the thermal management system of the invention, this figure illustrating thermal communications between refrigeration loop 501 and the system's three independent thermal control loops corresponding to the passenger cabin thermal control loop 503, the battery thermal control loop 505 and the drive train thermal control loop 507. The use of three independent thermal control circuits along with the refrigeration circuit allows the thermal management system to efficiently regulate the temperature within the passenger cabin, the battery pack and the drive train, specifically utilizing the heat generated within one subsystem to heat another subsystem. In the preferred embodiment shown in FIG. 5, independent thermal control loops 503, 505 and 507 utilize the same non-gaseous, heat transfer fluid, thereby allowing the control loops to operate either independently or in series as described below. Preferably the heat transfer fluid is water-based, e.g., pure water or water that includes an additive such as ethylene glycol or propylene glycol, although a non-water-based, heat transfer fluid may also be used in control loops 503, 505 and 507.

The passenger cabin includes a HVAC system, described in detail below, which provides the vehicle's occupants means for regulating cabin temperature. Coupled to battery thermal control loop 505 is a battery pack 509 that includes at least one, and typically a plurality of batteries (e.g., tens, hundreds, or thousands of batteries), contained within a battery pack enclosure. In at least one configuration the batteries are cylindrically-shaped, for example utilizing an 18650 form-factor, and are positioned within the battery pack so that the cylindrical axis of each battery is substantially perpendicular to the lower battery pack enclosure panel as well as the surface of the road. Cooling conduits 511, preferably deformable cooling conduits, which contain the heat transfer fluid (e.g., water), are in thermal communication with the batteries. In at least one preferred embodiment, the cooling conduits are aligned with the battery pack's lower panel, resulting in the coolant within the conduits flowing in a direction substantially perpendicular to the axes of the cylindrical batteries. By regulating the flow of the coolant (e.g., the heat transfer fluid) within the cooling conduits and/or regulating the transfer of heat from the coolant to another temperature control system, the temperature of the batteries may be regulated so that they remain within their preferred operating range. Preferably a thermal insulator (e.g., an air gap or one or more layers of a material with a low thermal conductivity) is used to limit the unintended transfer of thermal energy from the batteries and the battery cooling conduits to the battery pack enclosure. An example of a suitable battery pack cooling system is described in co-assigned U.S. patent application Ser. No. 14/148,933, filed 7 Jan. 2014, the disclosure of which is incorporated herein by reference for any and all purposes. It should be understood that in some vehicle configurations one or more additional components may be thermally coupled to thermal control loop 505.

Thermal control loop 507 is thermally coupled to drive train 513. Drive train 513 includes one or more motors, typically three phase alternating current (i.e., AC) motors, which are used to provide propulsive power to the vehicle. The portion of the drive train 513 that is thermally regulated may also include a transmission and/or a power inverter, for example as described in co-assigned U.S. patent application Ser. No. 14/176,053, filed 8 Feb. 2014, the disclosure of which is incorporated herein by reference for any and all purposes. The power inverter converts the direct current (i.e., DC) power from battery pack 509 to match the power requirements of the propulsion motor(s). The transmission may be a single speed, fixed gear transmission or a multi-speed transmission.

In the illustrated configuration, a DC/DC converter 515 is also thermally coupled to control loop 507. The DC/DC converter 515 is used to convert the output of battery pack 509 to a voltage more suitable for use with the vehicle's various electrical accessories and auxiliary systems (e.g., exterior and interior lighting, audio system, navigation system, blower fans, etc.).

Within drive train thermal control loop 507 the heat transfer fluid is circulated using coolant pump 517. Preferably coolant pump 517 is capable of circulating the heat transfer fluid within the control loop at a flow rate of at least 15 liters per minute (lpm), both when control loop 507 is operated independently of the other thermal circuits and when control loop 507 is coupled to another control loop as described below. Thermal control loop 507 also includes a coolant reservoir 519. Preferably reservoir 519 is a high by-pass reservoir that not only deaerates the coolant within the control loop, but also provides a convenient means for adding coolant to the system.

In order to passively cool the components that are thermally coupled to control circuit 507, components such as the motor, power inverter, gearbox and/or the DC/DC converter, the coolant is circulated through radiator 521. If there is insufficient air flow through radiator 521 to provide the desired level of passive cooling, for example when the vehicle is stopped or driving at slow speeds, a fan 523 may be used to force air through the radiator. Preferably the control loop also includes a valve 525, also referred to herein as a diverter valve, that allows radiator 521 to be decoupled, or partially decoupled, from loop 507.

As noted above, thermal control loops 503, 505 and 507 may be operated independently as illustrated in FIG. 5, or operated in series as described and illustrated below. Accordingly, in addition to circulation pump 517 that is coupled to circuit 507, circulation pumps must also be incorporated into loops 503 and 505. FIG. 5 shows a single circulation pump 527 incorporated into loop 505 and a single circulation pump 529 incorporated into loop 503. It will be appreciated that more than one circulation pump may be incorporated into any of the thermal control loops. Preferably, and as described above, each circulation pump is capable of circulating the heat transfer fluid contained within the corresponding control loop at a flow rate of at least 15 liters per minute (lpm), both when operating alone and when the corresponding control loop is serially coupled to one or more other thermal control loops.

The heat transfer fluid within the passenger cabin thermal control loop 503, which is circulated using pump 529, flows through a liquid-air heat exchanger 531. Preferably a supplemental electric heater 533 is also thermally coupled to control loop 503, thereby providing an additional means for heating the heat transfer fluid within loop 503 and thus heating the passenger cabin to the desired level.

In the preferred embodiment of the present invention, refrigerant-based thermal control loop 501 serves multiple purposes and can be used in either a conventional cooling mode or in a non-conventional heat pump mode. Included in loop 501 is a compressor 535, used to compress the low temperature vapor in the refrigerant line into a high temperature vapor, and an accumulator 537 that insures that only vapor passes into compressor 535. Valve 539 determines the direction of flow of the refrigerant within loop 501, and thus to a degree determines whether the refrigeration system is being used in a heat pump mode or in a conventional cooling mode.

Operating in a conventional mode, the refrigerant passes through expansion valve 541 prior to flowing through evaporator 543, where evaporator 543 is integrated into the passenger cabin's HVAC system. The air that is cooled by the refrigeration system's evaporator 543 is circulated throughout the passenger cabin using fan 545. After flowing through evaporator 543, accumulator 537 and compressor 535, the refrigerant passes through heat exchanger 547, also referred to herein as a condenser/evaporator due to its dual functionality as described in detail below. It will be appreciated that in this operational mode, heat exchanger 547 is performing as an air cooled condenser. Preferably the system also includes a blower fan 549 that may be used to force air through heat exchanger 547 if the vehicle is traveling at a low speed, or altogether stopped, thus insuring adequate heat transfer from the refrigerant to the ambient environment. Note that in this mode, by-pass valve 551 allows the refrigerant to by-pass expansion valve 553. If desired, the functionality of by-pass valve 551 and expansion valve 553 may be combined into a single electronic expansion valve.

When operating in the conventional mode, the refrigerant line is also coupled via expansion valve 555 to heat exchanger 557, where expansion valves 541 and 555 may be used to regulate the flow of refrigerant. Heat exchanger 557, which is a refrigerant/liquid exchanger, may also be referred to herein as a chiller. As shown, chiller 557 is coupled to battery thermal control loop 505, thus allowing battery pack 509 to be cooled by the heat transfer fluid within circuit 505.

Expansion valve 555 determines, at least in part, the amount of cooling provided by the refrigeration system to battery thermal control loop 505.

As noted above and illustrated in FIG. 5, the refrigeration system may also operate in a heat pump mode by altering the flow of refrigerant using valve 539. In this mode, the refrigerant passing through heat exchanger 559 is used to heat the heat transfer fluid within HVAC thermal control loop 503. Once heated, the heat transfer fluid is circulated through heat exchanger 531 which, in turn, heats the passenger cabin. Fan 545, or a different fan (not shown), is preferably used to circulate the heated air through the passenger cabin. When operating in this mode, the setting of by-pass valve 551 is changed so that the refrigerant can pass through expansion valve 553 prior to flowing through heat exchanger 547. Note that in this mode, heat exchanger 547 performs as an evaporator rather than as a condenser. Preferably the system also includes a by-pass valve 560 that provides an alternate refrigerant path around heat exchanger 559, thereby providing a simple means for limiting the amount of heat added to the heat transfer fluid by the heat exchanger. It will be appreciated that by using the refrigeration system as a heat pump and transferring heat from the refrigerant to the heat transfer fluid via heat exchanger 559, the cooling capacity of the AC system is increased.

In addition to using refrigeration control loop 501 to cool battery pack 509, as necessary, and either heat or cool the passenger cabin, the preferred thermal management system of the invention may be configured in a variety of ways, thus allowing the thermal system to be optimized. In the configuration shown in FIG. 5, thermal control loops 503, 505 and 507 are each operated independently. As a result, the temperature of the drive train components 513 and DC/DC converter 515 are passively cooled using radiator 521, where the amount of cooling is preferably controlled either by varying the flow rate using circulating pump 517 or varying coolant flow through radiator 521 using valve 525. When operating in a fully independent mode, the temperature of the coolant within battery pack thermal control circuit 505 is varied by controlling the amount of cooling provided via the refrigeration system and heat exchanger 557.

When the passenger thermal control loop 503 is operating in a fully independent mode, cooling is provided by the refrigeration system and evaporator 543. In this configuration, in order to heat the passenger cabin the heat transfer fluid within circuit 503 may either be heated using supplemental electric heater 533 or using the refrigeration system operating as a heat pump, where heat is transferred using heat exchanger 559.

Figure 6:
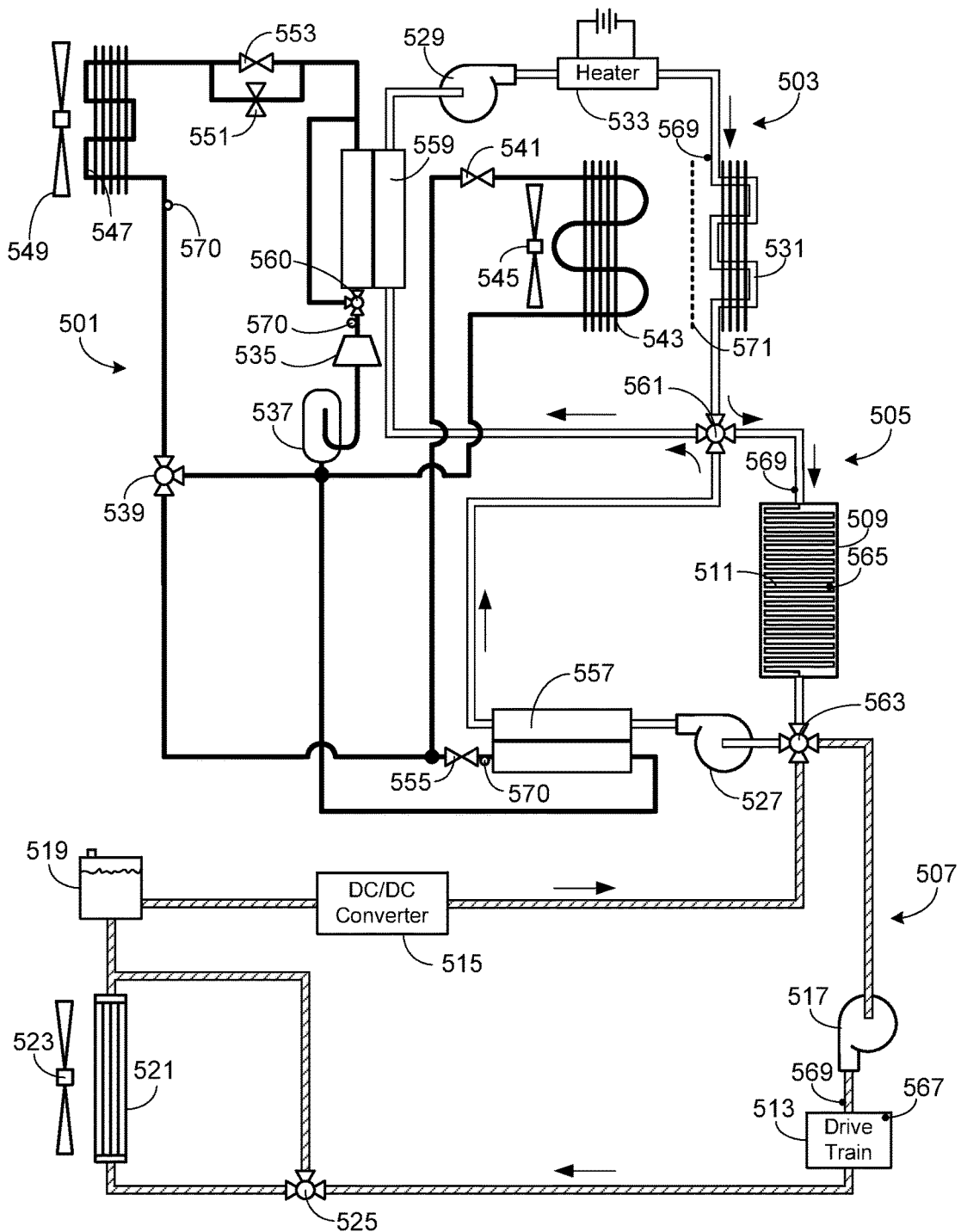
FIG. 6 illustrates an alternate configuration of the preferred thermal management system shown in FIG. 5 in which the passenger cabin thermal control loop is coupled to the battery pack thermal control loop.

FIG. 6 illustrates an alternate operational mode of the preferred thermal management system. In this configuration four-way valve 561 is altered in order to combine passenger cabin thermal control loop 503 with battery pack thermal control loop 505. In this configuration drive train thermal control loop 507 operates independently of the other two thermal control circuits. This operational mode provides several benefits. First, when the battery pack is running hot, this configuration allows excess battery pack heat to be transferred to the passenger cabin HVAC system, thus providing a means for heating the heat transfer fluid within circuit 503 and heat exchanger 531 without activating supplemental electric heater 533 or using the refrigeration system as a heat pump. Second, when the battery pack is cold, heat from thermal loop 503 may be used to heat the batteries within pack 509 to their optimum operating range, where the heat in thermal loop 503 may be generated either by supplemental electric heater 533 or refrigeration system 501 operating as a heat pump. Note that if battery heating is provided by the refrigeration system 501 operating as a heat pump and dumping heat into the heat transfer fluid via heat exchanger 559, supplemental heater 533 becomes unnecessary. As a result, the batteries can be heated to reach their optimum operating temperature without impacting vehicle efficiency by activating the supplemental heater. It will be appreciated that if the battery pack requires heat, but adding heat to the passenger cabin is undesirable, a temperature blend door in the HVAC system, represented as dashed line 571 in the figures, may be used to prevent, or regulate, air circulated by HVAC fan 545 from flowing past heat exchanger 531 and through the passenger cabin.

Figure 7:
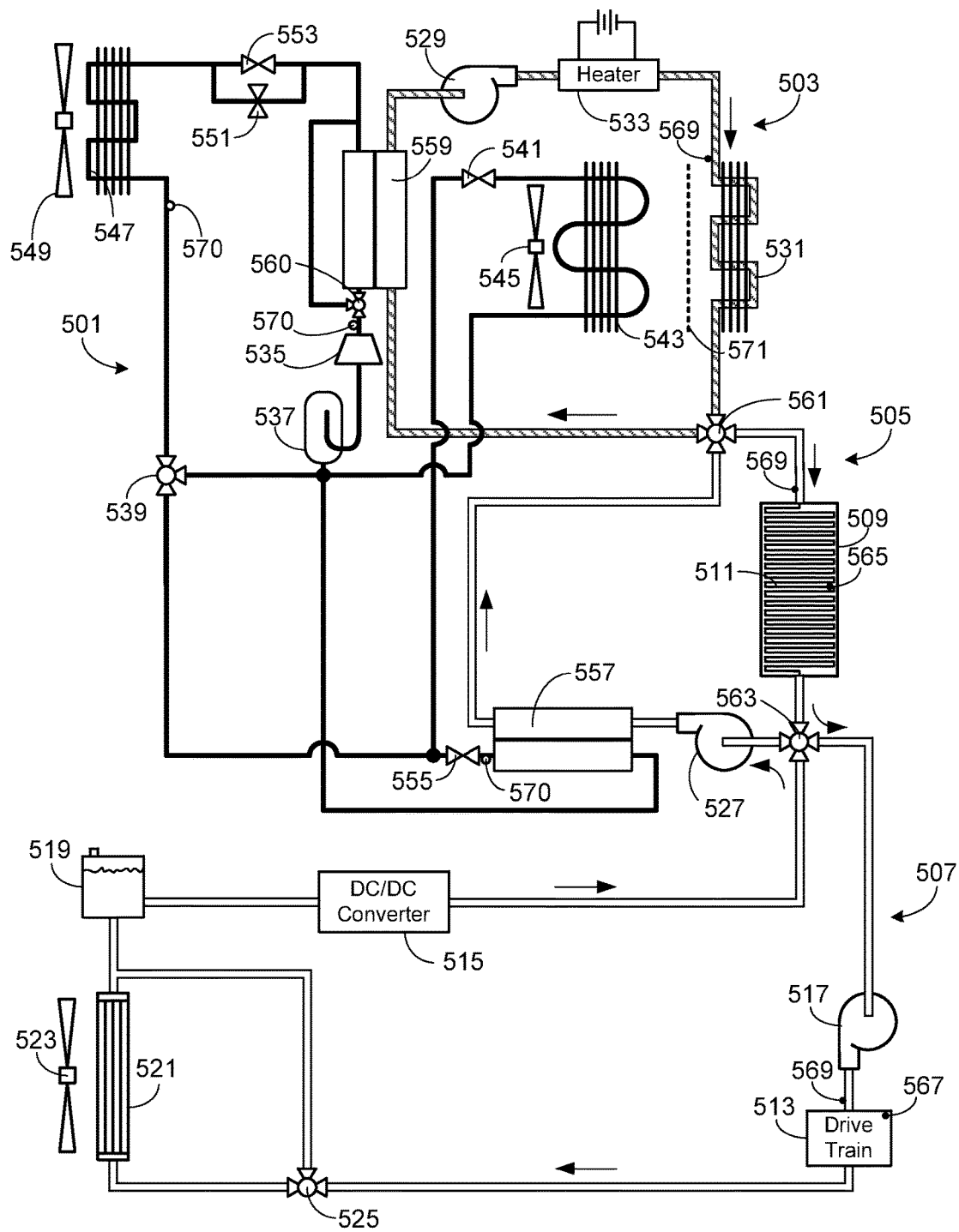
FIG. 7 illustrates an alternate configuration of the preferred thermal management system shown in FIG. 5 in which the battery pack thermal control loop is coupled to the drive train thermal control loop.

FIG. 7 illustrates another operational mode of the preferred thermal management system in which four-way valve 563 is altered in order to combine battery pack thermal control loop 505 with drive train thermal control loop 507. In this operational mode passenger cabin thermal control loop 503 operates independently of the other two thermal control circuits. As a result of this operational mode two techniques may be used, alone or in combination, to cool battery pack 509. First, the heat transfer fluid within the thermal loop may be cooled using refrigeration system 501 and heat exchanger 557. Second, the heat transfer fluid may be cooled by passing through radiator 521.

Figure 8:
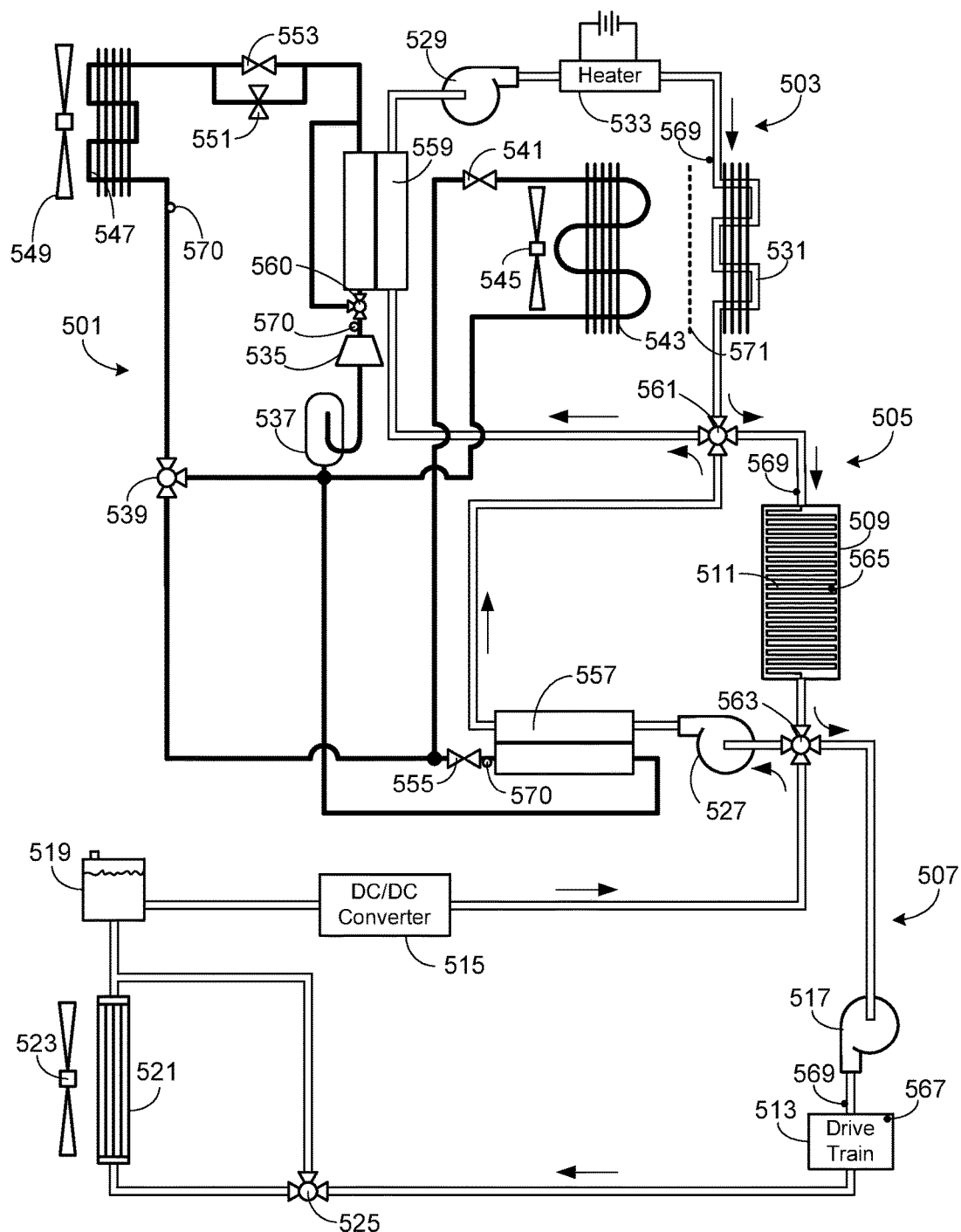
FIG. 8 illustrates an alternate configuration of the preferred thermal management system shown in FIG. 5 in which the passenger cabin thermal control loop is coupled to the battery pack thermal control loop which, in turn, is coupled to the drive train thermal control loop.

FIG. 8 illustrates a third operational mode of the thermal management system in which both four way valves 561 and 563 are opened, thereby coupling passenger cabin control loop 503 to battery pack control loop 505 which, in turn, is coupled to drive train control loop 507. As a result, the battery pack may be cooled and heat transferred out of the battery pack using the refrigeration system 501, and/or heat exchanger 531, and/or radiator 521.

Figure 9:
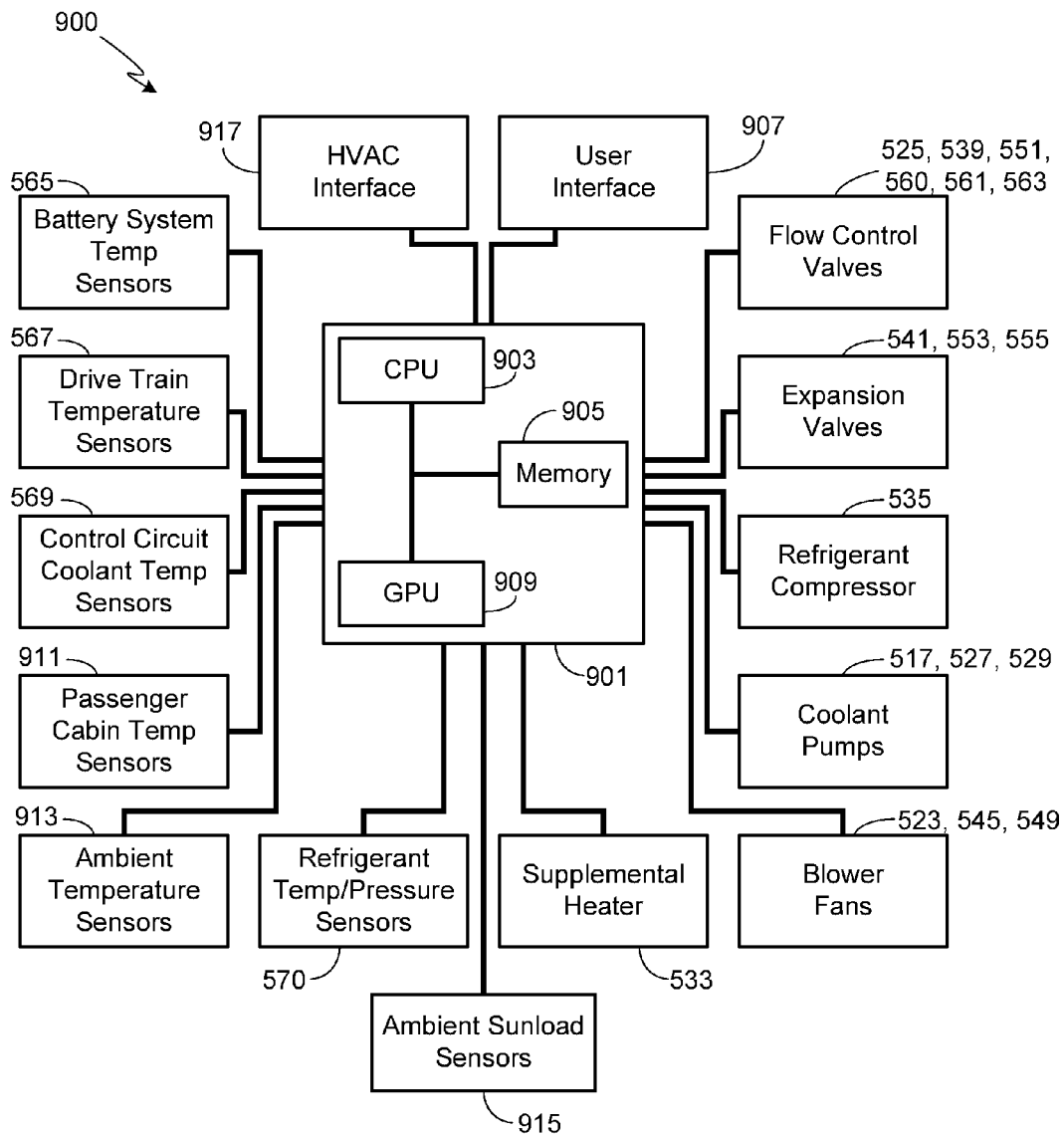
FIG. 9 provides a block diagram of an exemplary control system for use with the thermal management system shown in FIGS. 5-8.

FIG. 9 is a block diagram of an exemplary control system 900 for use with the thermal management system shown in FIGS. 5-8. Control system 900 includes a system controller 901. System controller 901 may be the same controller used to perform other vehicle functions, i.e., system controller 901 may be a vehicle system controller that may be used to control any of a variety of vehicle subsystems, e.g., navigation system, entertainment system, suspension (e.g., air suspension), battery charging, vehicle performance monitors, etc. Alternately, system controller 901 may be separate from the vehicle's system controller. System controller 901 includes a central processing unit (CPU) 903 and a memory 905. Memory 905 may be comprised of EPROM, EEPROM, flash memory, RAM, a solid state disk drive, a hard disk drive, or any other memory type or combination of memory types. Memory 905 may be used to store the preset operating temperature ranges for battery pack 509, drive train 513 and/or DC/DC converter 515. If the vehicle uses a touchscreen or similar display means 907 as the user interface, controller 901 may also include a graphical processing unit (GPU) 909. CPU 903 and GPU 909 may be separate or contained on a single chip set.

Coupled to controller 901 are a plurality of temperature sensors that monitor the temperatures of various components and subsystems under the control of the thermal control system. For example, battery pack 509 may include one or more temperature sensors 565 that monitor battery pack temperature. Other components and subsystems may also include temperature sensors, e.g., sensor 567 that monitors drive train 513. Temperature sensors may also be used to monitor the temperature of the heat transfer fluid within thermal control loops 503, 505 and 507, i.e., temperature sensors 569. Temperature/pressure sensors 570 are also preferably used to monitor the state of the refrigerant in thermal control loop 501. Lastly, the temperature within the passenger cabin (sensor 911), the ambient temperature (sensor 913), and the sun load (sensor 915) may also be monitored. Also coupled to controller 901 is a HVAC system interface 917 that allows the desired passenger cabin temperature to be set by the driver and/or passengers, where the desired temperature may be configured to either be set by zone or a single temperature for the entire cabin. The HVAC system interface 917 may be a HVAC dedicated interface, e.g., temperature control switches mounted within the passenger cabin, or may utilize a common user interface such as display interface 907.

As described above, the thermal control system of the invention uses a variety of valves and other components to maintain each of the vehicle's subsystems (e.g., battery pack, drive train components, passenger cabin, etc.) within their desired temperature range while optimizing overall system efficiency. Accordingly, coupled to and controlled by controller 901 are flow control valves 525, 539, 551, 560, 561 and 563; expansion valves 541, 553 and 555; compressor 535; HVAC temperature blend door 571; heat transfer fluid circulating pumps 517, 527 and 529; blower fans 523, 545 and 549; and heater 533.

Figure 10:
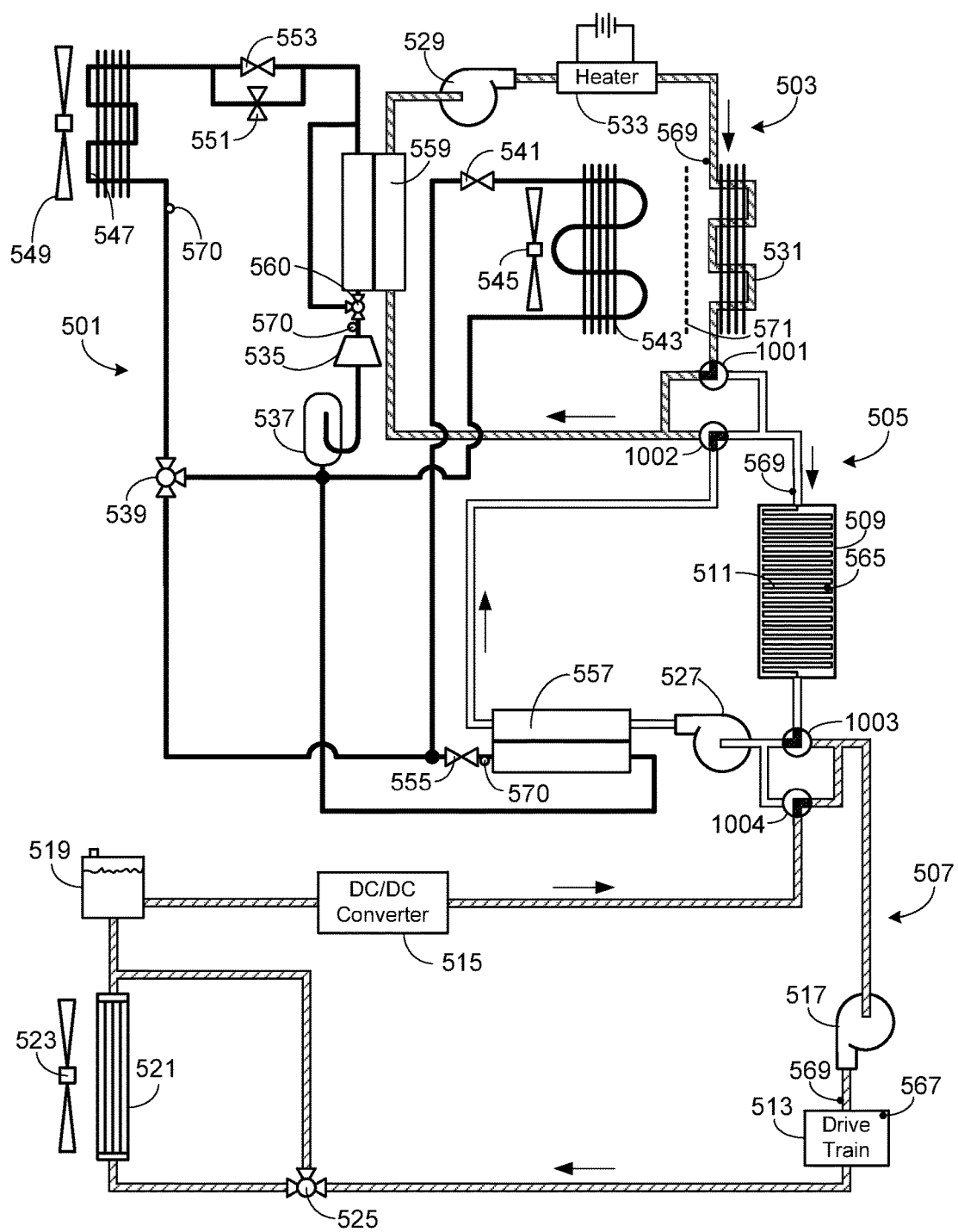
FIG. 10 illustrates a modification of the preferred thermal management system shown in FIG. 5 in which each four-way valves is replaced with a pair of three-way valves.
Figure 11:
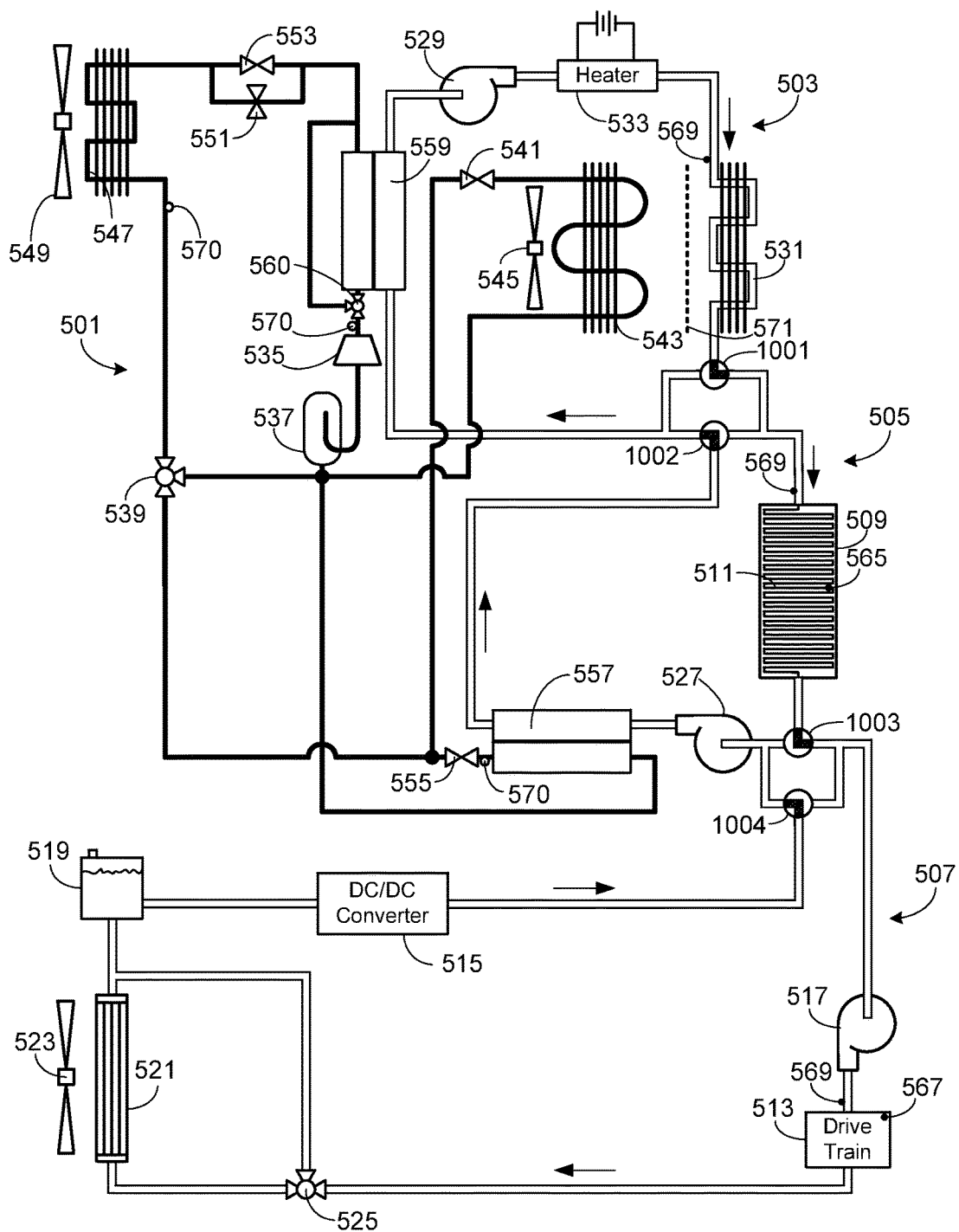
FIG. 11 illustrates the thermal management system shown in FIG. 10, reconfigured to serially couple the passenger cabin thermal control loop to the battery pack thermal control loop which, in turn, is coupled to the drive train thermal control loop.

In will be appreciated that the embodiment described above may be modified while still retaining many of the benefits of the preferred approach. For example, four-way valve 561 may be replaced with a pair of three-way valves. Similarly, four-way valve 563 may be replaced with a pair of three-way valves. FIGS. 10 and 11 illustrate an embodiment in which both four-way valves are replaced. FIG. 10 illustrates a configuration similar to that shown in FIG. 5 in which thermal control circuits 503, 505 and 507 are operated independently of one another. FIG. 11 illustrates an operational mode similar to that shown in FIG. 8 in which thermal control circuits 503, 505 and 507 are serially coupled. It should be understood that valves 1001-1004 may also be configured to provide the same operational modes as illustrated in FIGS. 6 and 7.

Figure 12:
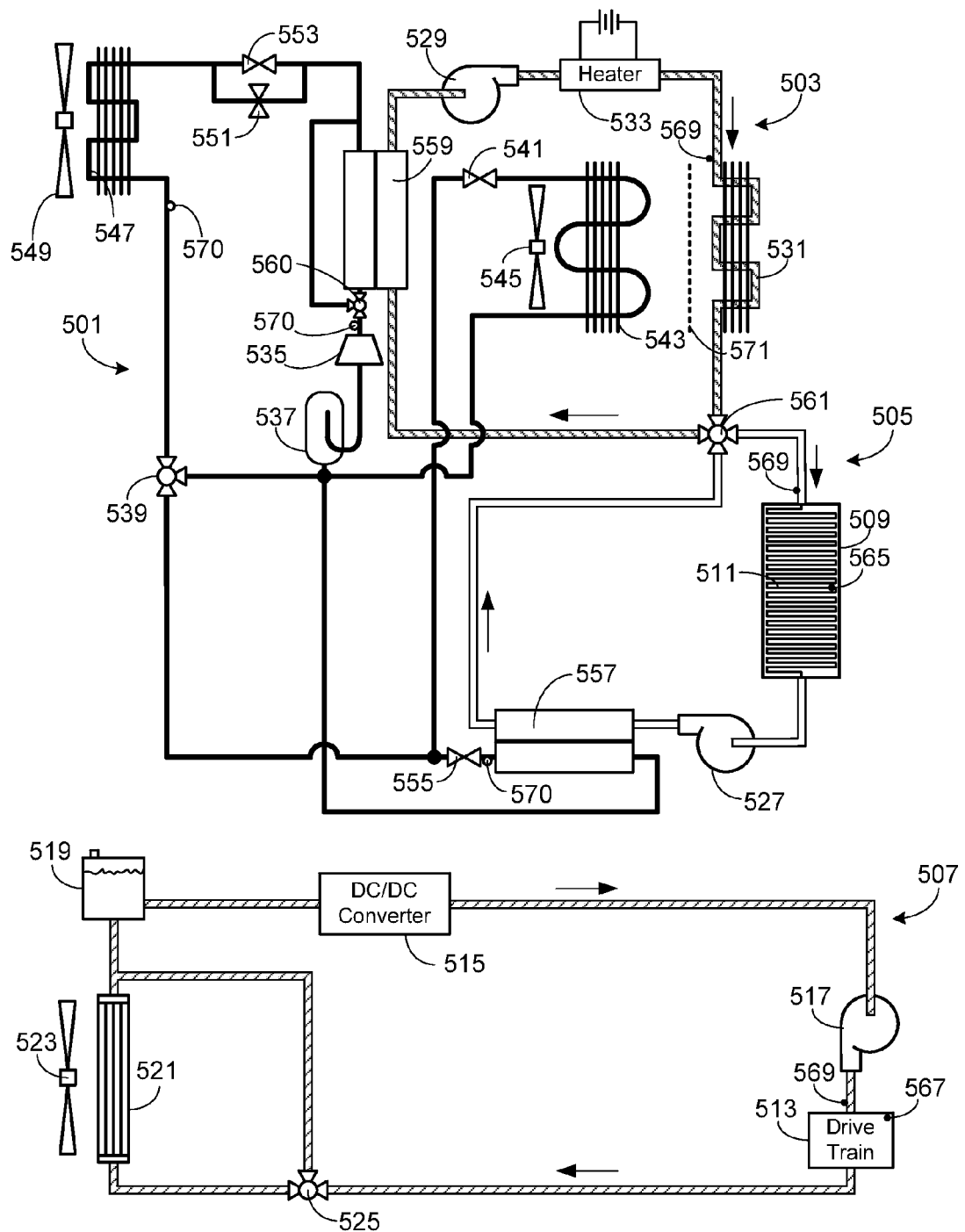
FIG. 12 illustrates a modification of the preferred thermal management system shown in FIGS. 5-8 in which one of the four-way valves is eliminated, thereby causing the drive train thermal control loop to operate independently of the passenger cabin thermal control loop and the battery pack thermal control loop.

FIG. 12 illustrates another modification of the embodiment shown in FIGS. 5-8 in which four-way valve 563 is eliminated. As a result of eliminating valve 563, drive train thermal control loop 507 always operates independently of passenger cabin thermal control loop 503 and battery pack thermal control loop 505. In this configuration drive train thermal control loop 507 is also independent of refrigeration thermal control loop 501. Note that due to the inclusion of four-way valve 561, the passenger cabin and battery pack thermal circuits may be operated independently of one another, i.e., parallel operation, or serially as shown in FIG. 6. It will be appreciated that four-way valve 561 may be replaced with a pair of three-way valves as shown in FIGS. 10 and 11.

Figure 13:
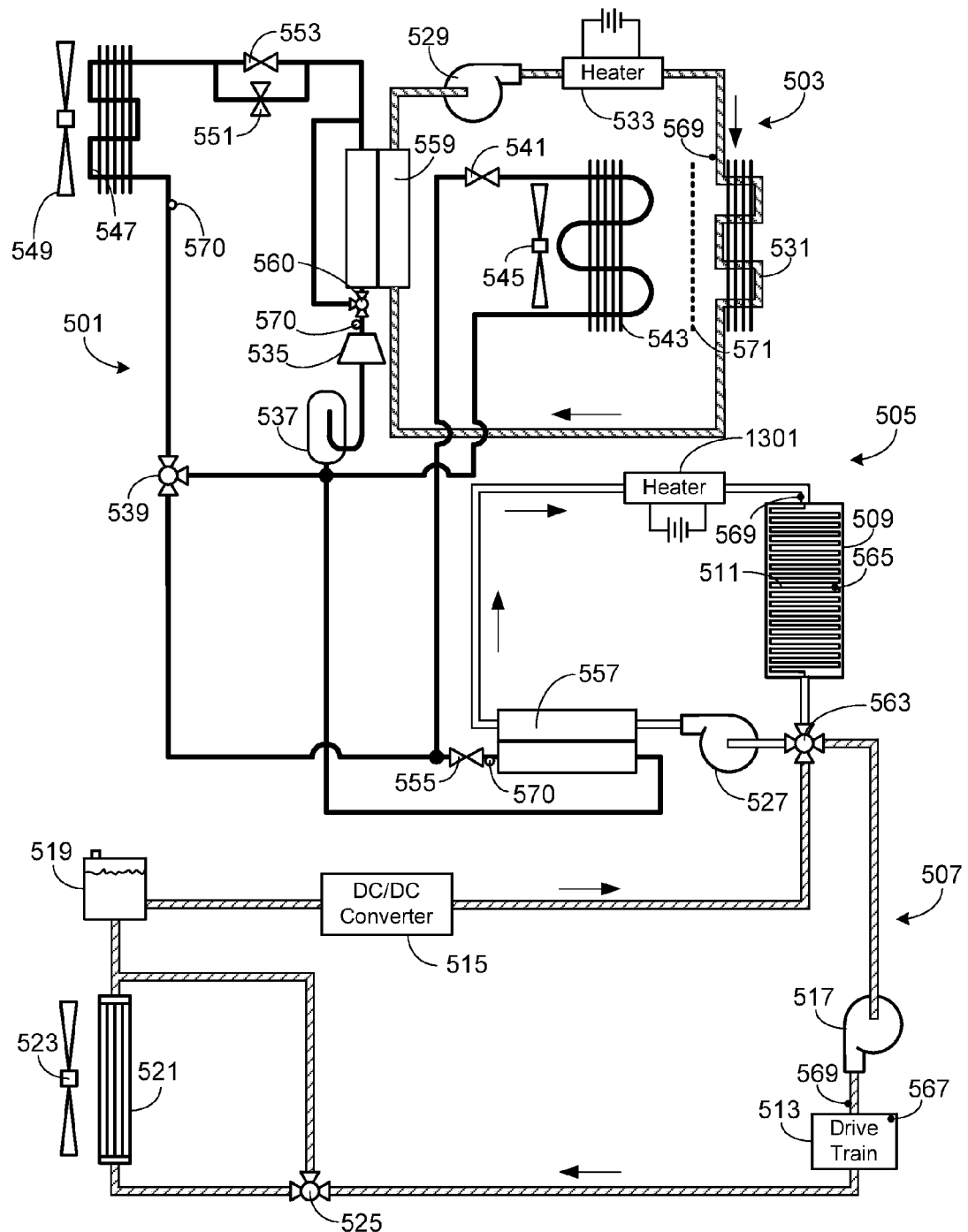
FIG. 13 illustrates a modification of the preferred thermal management system shown in FIGS. 5-8 in which one of the four-way valves is eliminated, thereby causing the passenger cabin thermal control loop to operate independently of the battery pack thermal control loop and the drive train thermal control loop.

FIG. 13 illustrates yet another modification of the embodiment shown in FIGS. 5-8 in which four-way valve 561 is eliminated. As a result of eliminating valve 561, passenger cabin thermal control loop 503 always operates independently of battery pack thermal control loop 505 and drive train thermal control loop 507. Preferably in this embodiment a supplemental heater 1301 is included in the battery thermal control loop 505, thus providing a means of actively heating the batteries within pack 509. Note that due to the inclusion of four-way valve 563, the battery pack and drive train thermal circuits may be operated independently of one another, i.e., parallel operation, or serially as shown in FIG. 7. It will be appreciated that four-way valve 563 may be replaced with a pair of three-way valves as shown in FIGS. 10 and 11.

Figure 14:
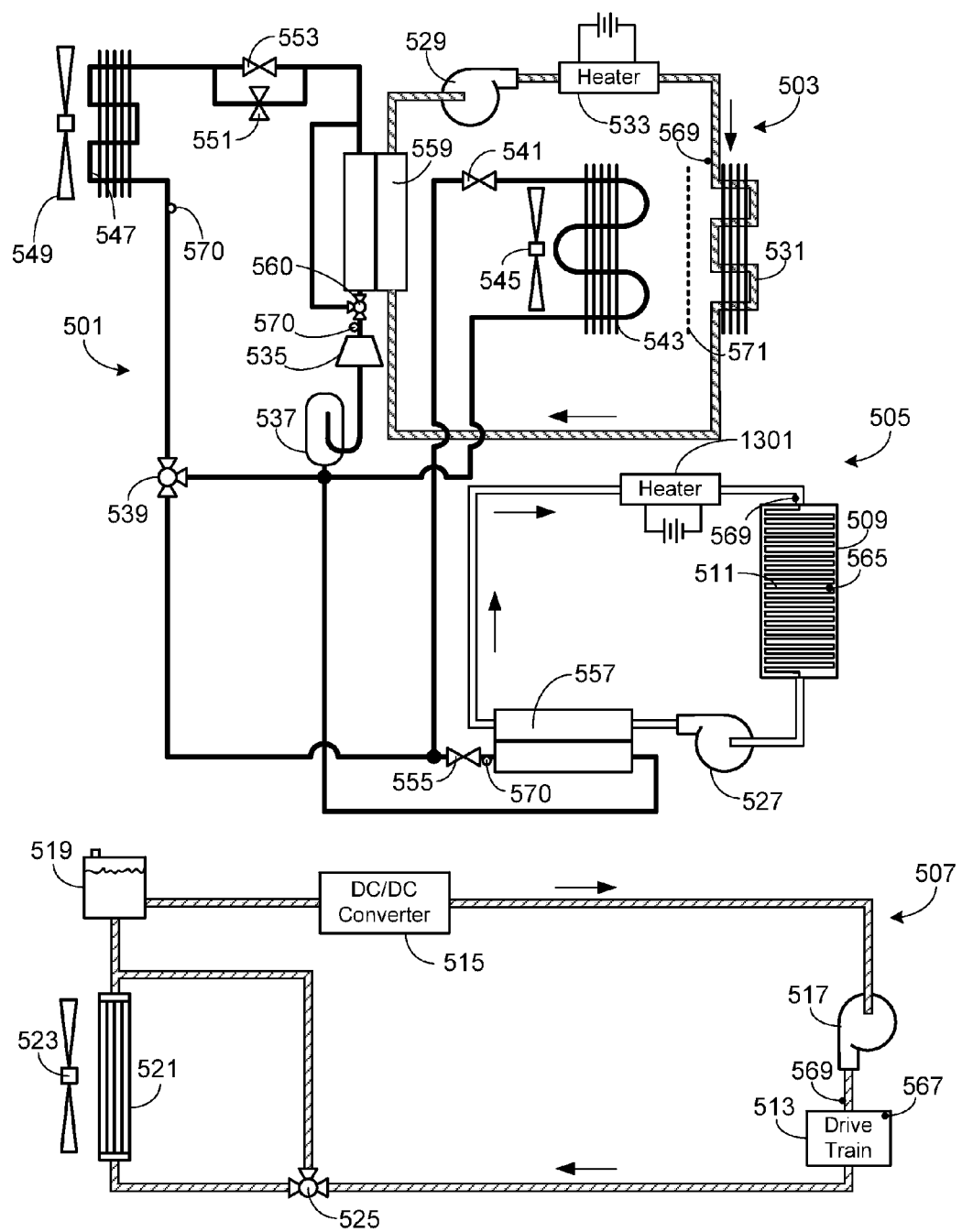
FIG. 14 illustrates a modification of the preferred thermal management system shown in FIGS. 5-8 in which both four-way valves are eliminated, thereby causing independent operation of the passenger cabin thermal control loop, the battery pack thermal control loop and the drive train thermal control loop.

FIG. 14 illustrates yet another modification of the embodiment shown in FIGS. 5-8 in which four-way valves 561 and 563 are eliminated. The elimination of both four-way valves results in independent operation of the passenger cabin thermal control loop 503, the battery pack thermal control loop 505 and the drive train thermal control loop 507. As in the embodiment shown in FIG. 13, preferably a supplemental heater 1301 is included in the battery thermal control loop 505 in order to provide a means for actively heating the batteries as deemed necessary.

Figure 15:
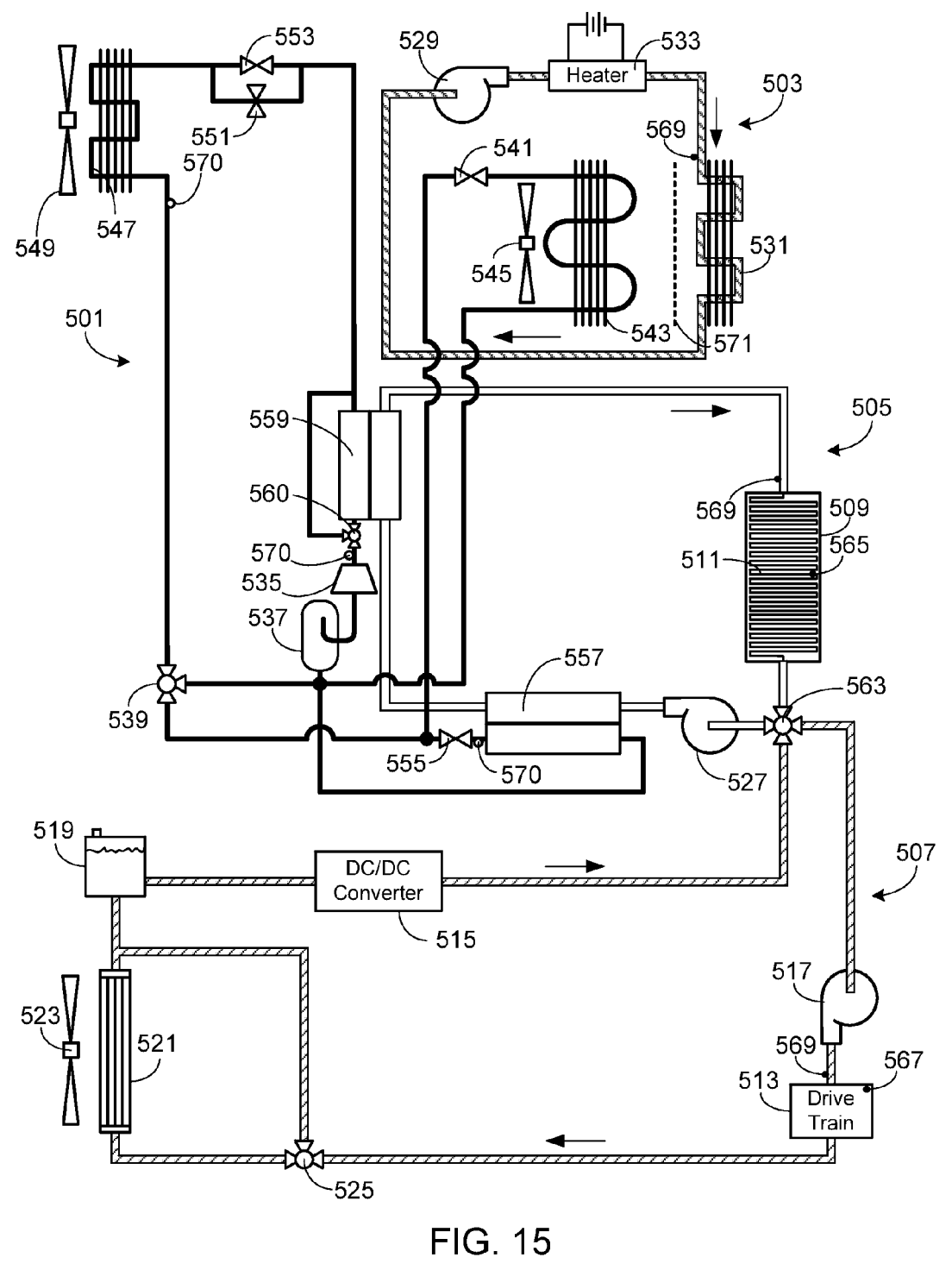
Figure 16:
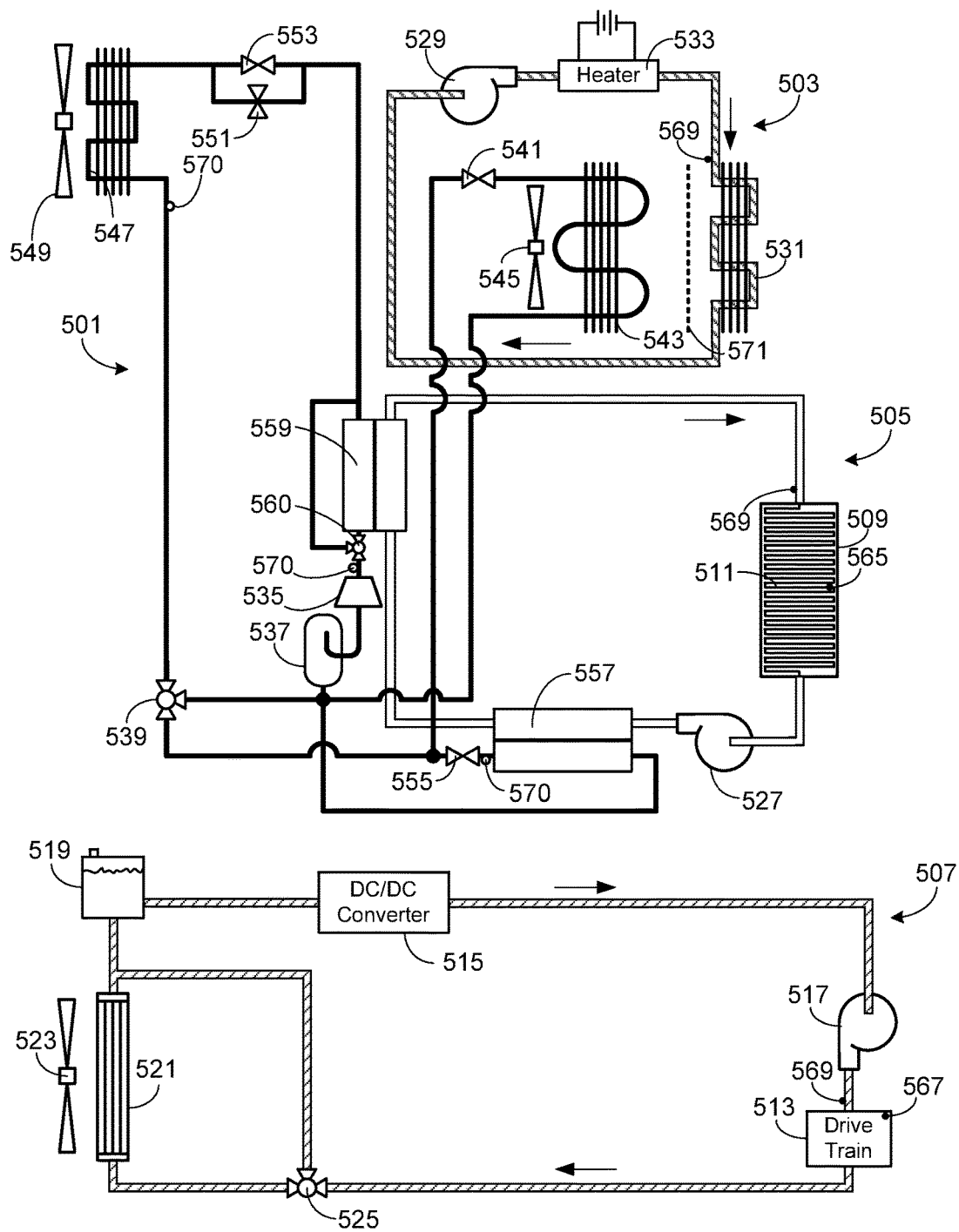
FIG. 16 illustrates a modification of the thermal management system shown in FIG. 14 in which the refrigeration system is used as a heat pump to heat the battery pack thermally coupled to the battery thermal control loop.
Figure 17:
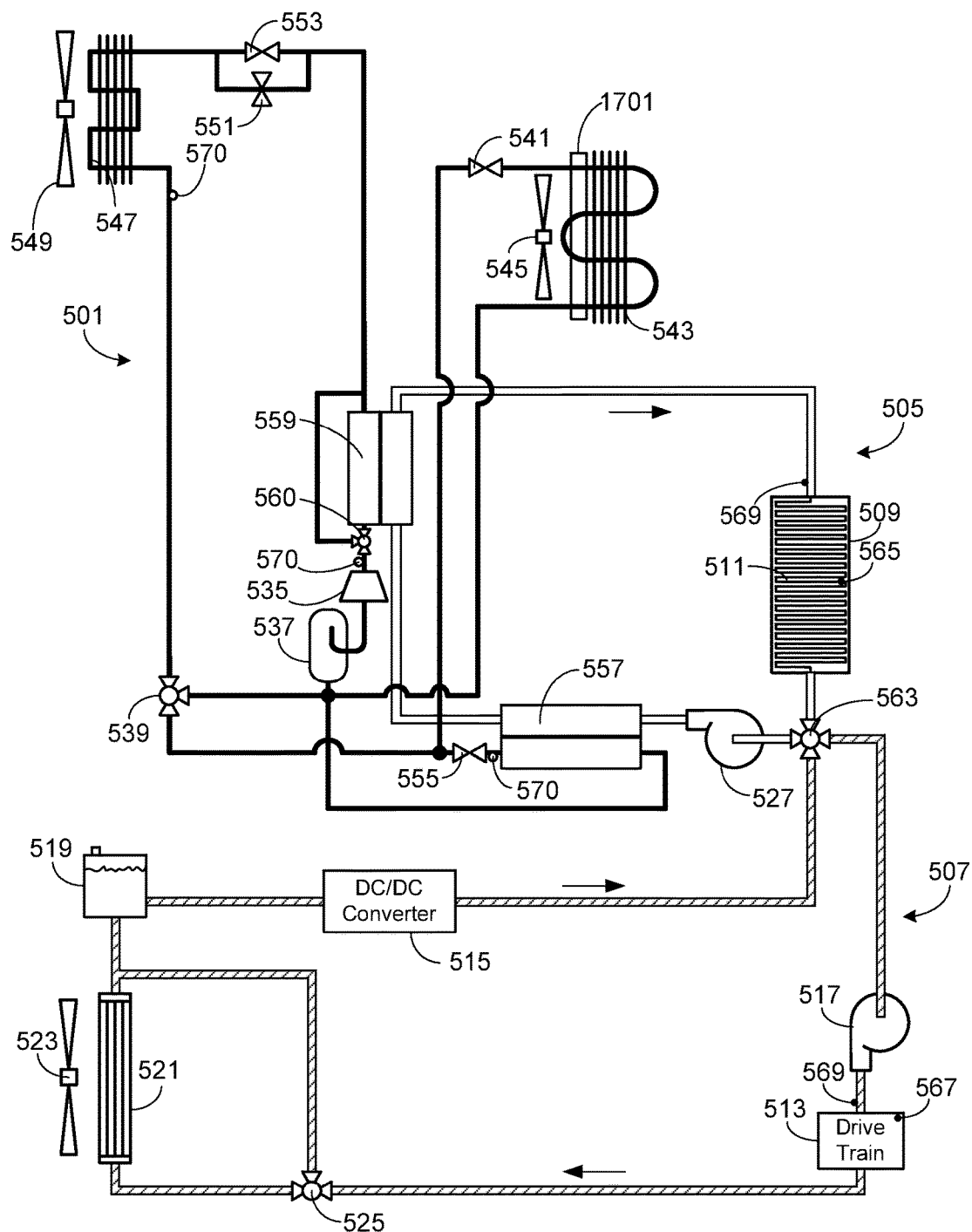
FIG. 17 illustrates a modification of the thermal management system shown in FIG. 15 utilizing an alternate passenger cabin heating system.
Figure 18:
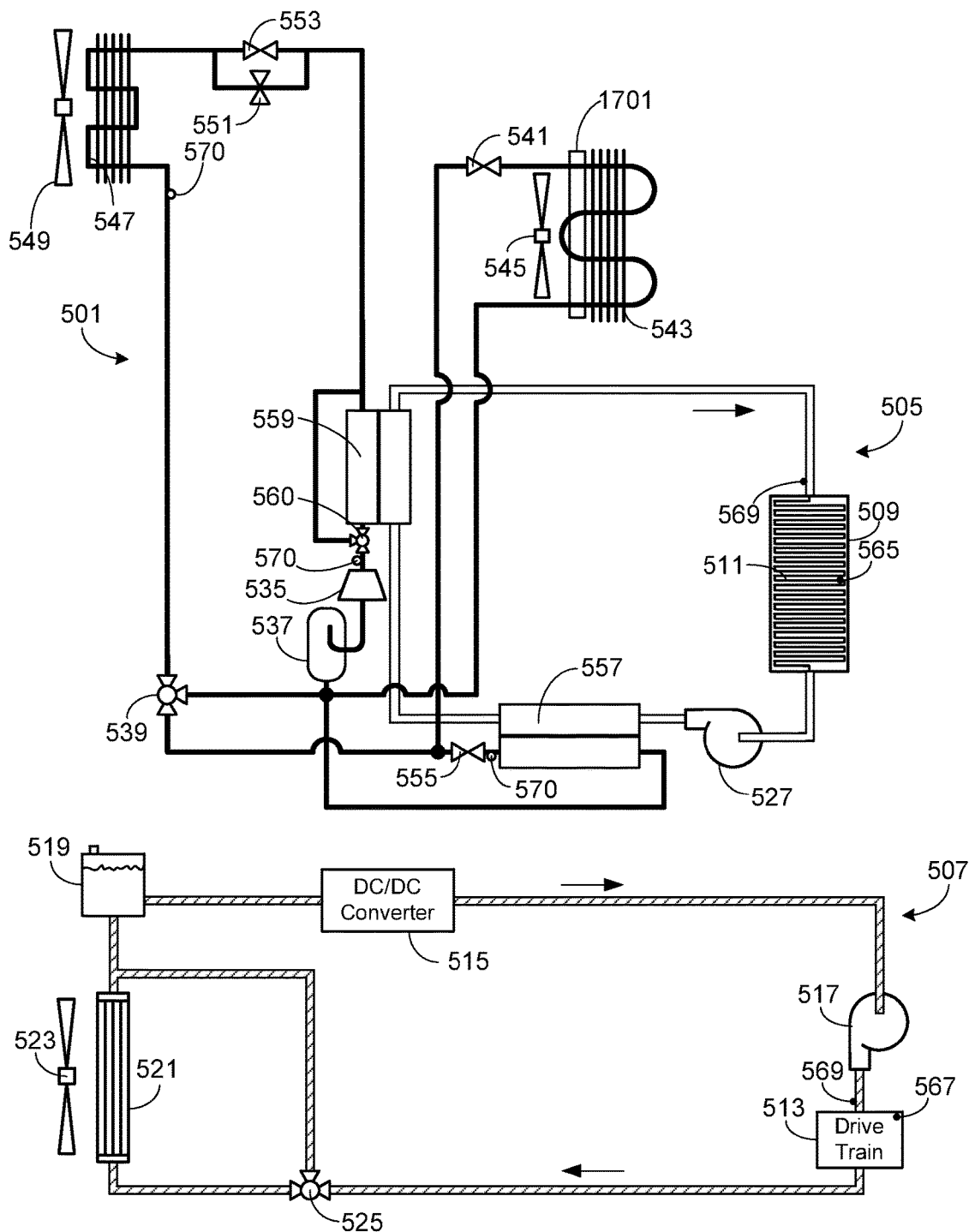
FIG. 18 illustrates a modification of the thermal management system shown in FIG. 16 utilizing an alternate passenger cabin heating system.

As noted above, in order to provide active battery heating for the embodiments shown in FIGS. 13 and 14, a supplemental heater 1301 is incorporated into the battery thermal control loop 505. FIGS. 15 and 16 illustrate an alternate approach of active battery heating, based on FIGS. 13 and 14, which utilizes heat exchanger 559 and the refrigeration loop 501 rather than supplemental heater 1301 to heat the heat transfer fluid within the battery loop. Note that if desired, supplemental heater 1301 may also be added to the embodiments shown in FIGS. 15 and 16. Furthermore, while passenger cabin heating can be provided using supplemental heater 533 as shown in FIGS. 15 and 16, preferably an electric air heater 1701, e.g., incorporated into evaporator assembly 543, is used for passenger cabin heating as shown in FIGS. 17 and 18.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A multi-mode vehicle thermal management system, comprising:
   a passenger cabin thermal control loop comprising a first circulation pump and a liquid-air heat exchanger, wherein said first circulation pump circulates a first heat transfer fluid within said passenger cabin thermal control loop and through said liquid-air heat exchanger, and wherein said passenger cabin thermal control loop provides temperature control of a vehicle passenger cabin;
   a battery thermal control loop comprising a second circulation pump, wherein said second circulation pump circulates a second heat transfer fluid within said battery thermal control loop, wherein said battery thermal control loop is thermally coupled to a vehicle battery pack, and wherein said passenger cabin thermal control loop operates in parallel with and independent of said battery thermal control loop;
   a drive train control loop comprising a third circulation pump, wherein said third circulation pump circulates a third heat transfer fluid within said drive train control loop, wherein said drive train control loop is thermally coupled to at least one drive train component, wherein said passenger cabin thermal control loop operates in parallel with and independent of said drive train thermal control loop, and wherein said battery thermal control loop operates in parallel with and independent of said drive train thermal control loop;

a refrigerant-based thermal control loop, wherein said refrigerant-based thermal control loop is comprised of a refrigerant, a compressor, and a condenser/evaporator;

a refrigerant-air heat exchanger coupled to said refrigerant-based thermal control loop by a first expansion valve, wherein said refrigerant-air heat exchanger is thermally coupled to a vehicle HVAC system;

a refrigerant valve operable in at least two modes; and a refrigerant-fluid heat exchanger coupled to said battery thermal control loop, wherein said refrigerant valve in a first mode directs said refrigerant through said refrigerant-air heat exchanger and said first expansion valve, wherein said refrigerant valve in a second mode directs said refrigerant through said refrigerant-fluid heat exchanger, and wherein said second heat transfer fluid within said battery thermal control loop is heated when said refrigerant is directed through said refrigerant-fluid heat exchanger.

2. The multi-mode vehicle thermal management system of claim 1, further comprising a second refrigerant-fluid heat exchanger coupled to said refrigerant-based thermal control loop by a second expansion valve, wherein said second refrigerant-fluid heat exchanger is thermally coupled to said battery thermal control loop.

3. The multi-mode vehicle thermal management system of claim 1, further comprising:

a refrigerant by-pass valve; and a second expansion valve interposed between said refrigerant-fluid heat exchanger and said condenser/evaporator, wherein when said refrigerant valve is in said first mode said refrigerant by-pass valve is configured to allow said refrigerant in said refrigerant-based thermal control loop to by-pass said second expansion valve, and wherein when said refrigerant valve is in said second mode said refrigerant by-pass valve is configured to allow said refrigerant in said refrigerant-based thermal control loop to flow through said second expansion valve.

4. The multi-mode vehicle thermal management system of claim 3, wherein said refrigerant by-pass valve and said second expansion valve are combined in an electronic expansion valve.

5. The multi-mode vehicle thermal management system of claim 1, further comprising a refrigerant by-pass valve, wherein said refrigerant by-pass valve in a first mode of operation couples said refrigerant-fluid heat exchanger to said refrigerant-based thermal control loop, and wherein said refrigerant by-pass valve in a second mode of operation decouples said refrigerant-fluid heat exchanger from said refrigerant-based thermal control loop.

6. The multi-mode vehicle thermal management system of claim 1, said passenger cabin thermal control loop further comprising a supplemental electric heater configured to heat said first heat transfer fluid of said passenger cabin thermal control loop when electrical power is connected to said supplemental electric heater.

7. The multi-mode vehicle thermal management system of claim 1, further comprising a radiator coupled to said drive train thermal control loop.

8. The multi-mode vehicle thermal management system of claim 7, further comprising a fan configured to force air through said radiator.

9. The multi-mode vehicle thermal management system of claim 7, further comprising a diverter valve, wherein said diverter valve in a first position couples said radiator to said drive train thermal control loop and allows at least a portion of said third heat transfer fluid to flow through said radiator, and wherein said diverter valve in a second position decouples said radiator from said drive train thermal control loop and allows said third heat transfer fluid within said drive train thermal control loop to by-pass said radiator.

10. The multi-mode vehicle thermal management system of claim 9, wherein said diverter valve in said first position allows a second portion of said third heat transfer fluid to by-pass said radiator, and wherein said diverter valve in a third position couples said radiator to said drive train thermal control loop and allows said third heat transfer fluid to flow through said radiator while preventing said second portion of said third heat transfer fluid from by-passing said radiator.

11. The multi-mode vehicle thermal management system of claim 1, said vehicle battery pack comprising a plurality of batteries and a plurality of cooling conduits in thermal communication with said plurality of batteries, wherein said second heat transfer fluid within said battery thermal control loop flows through said plurality of cooling conduits.

12. The multi-mode vehicle thermal management system of claim 1, said at least one drive train component selected from the group consisting of a motor, a gearbox, and a power inverter.

13. The multi-mode vehicle thermal management system of claim 1, further comprising a DC/DC converter thermally coupled to said drive train control loop.

14. The multi-mode vehicle thermal management system of claim 1, wherein said first heat transfer fluid is selected from the group consisting of water and water containing an additive, wherein said second heat transfer fluid is selected from the group consisting of water and water containing said additive, and wherein said third heat transfer fluid is selected from the group consisting of water and water containing said additive.

15. The multi-mode vehicle thermal management system of claim 14, wherein said additive is selected from the group consisting of ethylene glycol and propylene glycol.

16. The multi-mode vehicle thermal management system of claim 1, further comprising a coolant reservoir, wherein said third heat transfer fluid within said drive train thermal control loop flows into and out of said coolant reservoir.

* * * * *